Feb. 23, 1965   L. P. BURTON   3,170,638
MIXING AND DISINTEGRATING HEAD
Filed April 12, 1963   2 Sheets-Sheet 1
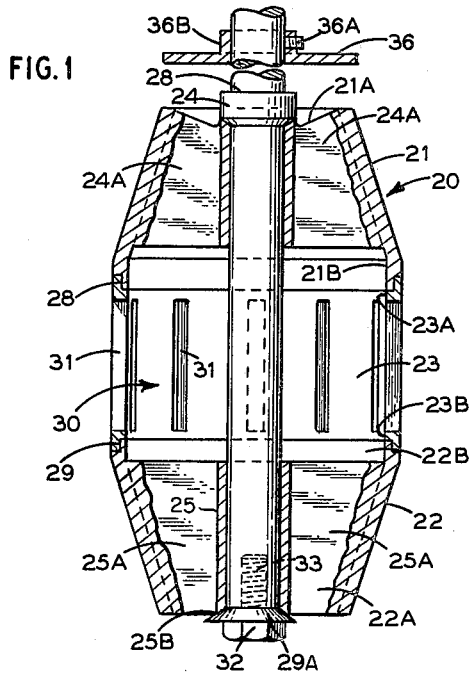
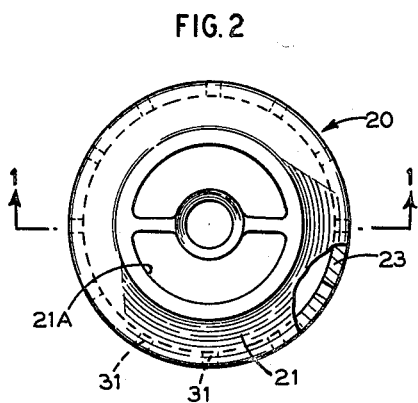
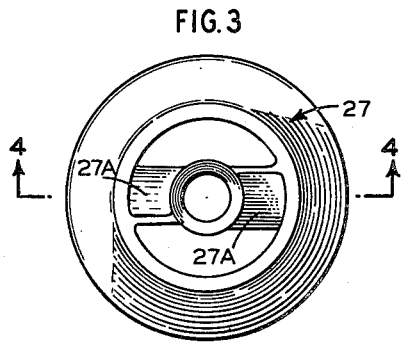
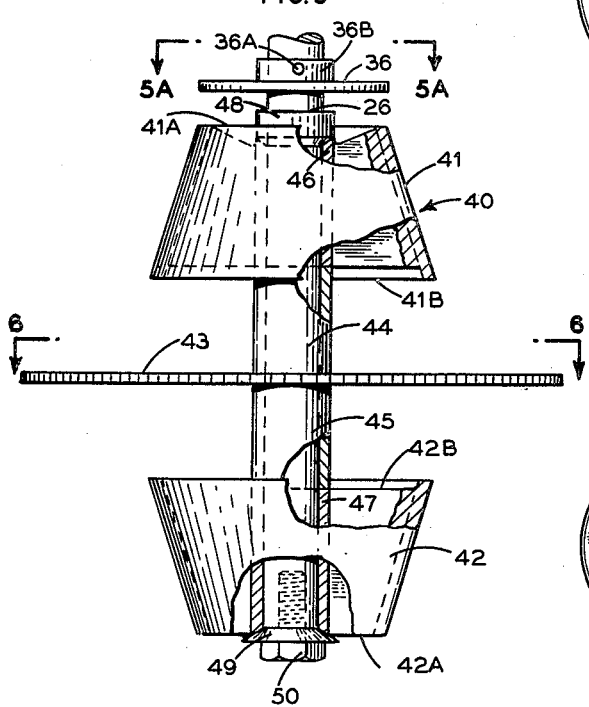
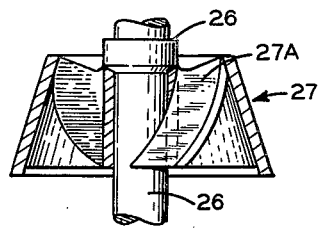
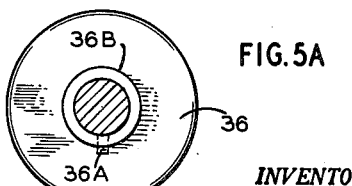
INVENTOR.
Linwood P. Burton
BY
ATTORNEY Feb. 23, 1965 L. P. BURTON 3,170,638
MIXING AND DISINTEGRATING HEAD
Filed April 12, 1963 2 Sheets-Sheet 2
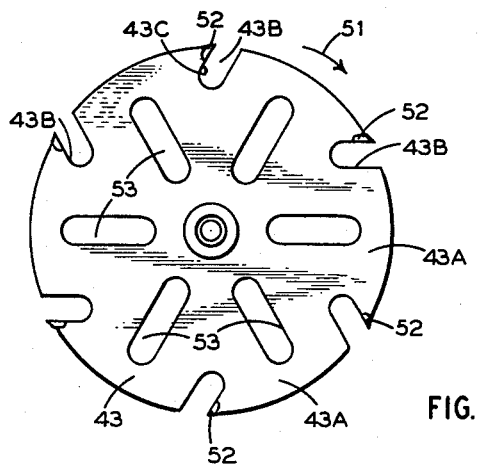
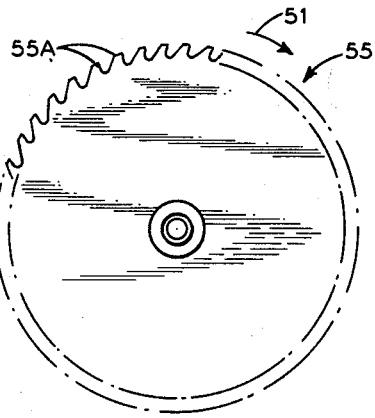
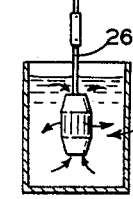
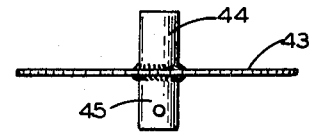
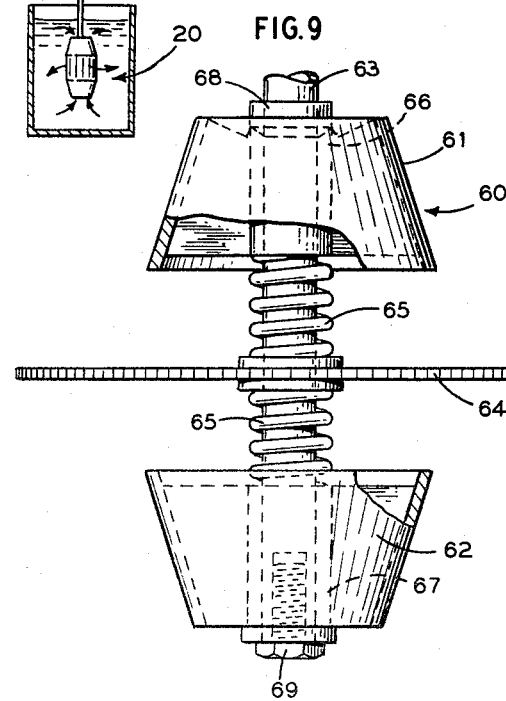
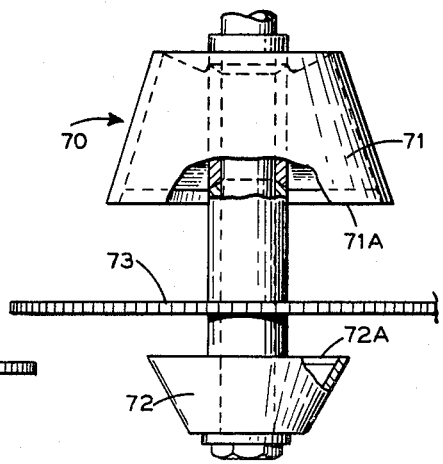
INVENTOR.
Linwood P. Burton
BY
Arthur F. Fattibene
ATTORNEY United States Patent Office 3,170,638
Patented Feb. 23, 1965

3,170,638
MIXING AND DISINTEGRATING HEAD
Linwood P. Burton, 80 Cranberry St., Brooklyn, N.Y.
Filed Apr. 12, 1963, Ser. No. 272,667
10 Claims. (Cl. 241—46)

This invention relates in general to a mixing head, and more specifically to a centrifugal mixing head for intensely mixing fluid materials.

Heretofore, many efforts have been made to develop a centrifugal mixing head that will satisfactorily blend, mix, homogenize, dissolve, emulsify, disperse or disintegrate fluids having various physical and/or chemical characteristics. However, the known constructions each contain certain inherent disadvantages. Many of the known constructions were capable of only limited application or use. For example, a head capable of dispersing in a liquid a material heavier than the liquid would be ineffective for mixing in a liquid a material which is lighter than the liquid, and vice versa. Also, it has been noted that the viscosity of the material to be mixed had an adverse effect on the mixing operation utilizing the known mixing head constructions. It has been observed in mixing operations utilizing mixing heads of the type having a mixing chamber defined by a partition extending transversely between the ends thereof, that there is a tendency for the whirling viscous fluid within the mixing chamber of the head to form a mass that is or approaches the nature of a solid. When this occurs, the effectiveness of the mixing head is greatly diminished. As a result, the time and power required for effecting the mixture is greatly increased. This is due to the fact that the creation of a mass approaching that of a solid within such partitioned head renders it difficult to flow and appreciably increases the load on the motor driving the same. Since the known head constructions because of their inherent design characteristics were reasonably effective for only certain types of mixing operation, it was necessary for one to have on hand several different kinds or designs of the head constructions so as to be prepared for performing the various mixing operations. As the initial cost of such heads is considerable, a relatively large expenditure of capital was heretofore required to stock various head constructions necessary for running several different types of mixing operations, e.g. mixing liquids with a material lighter than the liquid, or mixing a liquid with a material heavier than the liquid, or mixing liquids of relative viscosity and the like.

Therefore, an object of this invention is to provide a mixing head that has universal application for satisfactorily accomplishing all kinds of mixing operations with substantially equal facility and efficiency.

Another object is to provide an improved mixing head capable of effecting an intense mixing action with a minimum of excessive circulation to thereby result in substantial savings both in mixing time and power.

Still another object is to provide a centrifugal mixing head capable of effecting intense shearing of the material being mixed and thereby enhance the mixing action.

Still another object is to provide a mixing head constructed and arranged to equalize the loading on the respective ends thereof so as to minimize the back pressure on the motive means driving the same.

Still another object is to provide a mixing head construction with means for controlling the vortex created during a mixing operation.

Still another object is to provide a mixing head with improved distance piece or mixing chamber construction that prohibits choking up of the head during a mixing operation.

Still another object is to provide a mixing head with means for mechanically pulverizing particle size materials which are to be dispersed or placed in solution with a liquid.

Still another object is to provide an improved mixing head that is relatively simple in construction, inexpensive to fabricate, and positive in operation.

In accordance with this invention, the above objects and other features and advantages are attained by a centrifugal mixing head comprising essentially of a pair of frusto-conical members which are co-axially spaced along a drive shaft so that the respective large ends thereof face or discharges toward one another. Each of the frusto-conical members includes a bearing sleeve or hub and a pair of opposed vane means which may be either straight or pitched at an angle. The respective vanes integrally connect the hub to its respective conical member. The walls of the conical members are preferably imperforate. Disposed between the respective conical members is a distance piece.

In one form of the invention, the distance piece comprises a tubular body which is secured between the facing or discharging ends of the respective conical members, and defines therebetween a mixing chamber that is in full open communication with each of the respective discharge ends of the frusto-conical members. A series of openings are circumferentially spaced in the wall portion of the tubular member to define discharge ports through which the fluid within the head is discharged.

In another form of the invention, a shearing plate or disc is interposed in spaced relationship between the large discharge end portions of the conical members. The periphery of the shearing plate or disc is further provided with cutting edges so as to effect a shearing or pulverizing effect on particles being mixed in solution.

In another from of the invention, means are provided to automatically equalize the loading on the respective frusto-conical members by causing the same to effect a relative movement therebetween during a mixing operation in accordance with the loadings imposed thereon.

In still another form of the invention, the respective discharge ends of the opposed frusto-conical members are formed with different diameters so as to create a differential in the rate of outflow from the respective discharge ends, and thereby enhance the intermingling of the fluid flow from the respective discharge ends.

The instant invention further contemplates the employment of means adjustably mounted on the drive shaft for movement toward and away from the upper end of the mixing head to control the amount of vortexing created during a mixing operation.

A feature of this invention resides in the provision that the construction and arrangement of the respective embodiments of the invention are such that there is a minimum of restriction in the flow of the fluid entering and discharging from their respective conical end members.

Still another feature of this invention resides in the improved manner in which a mechanical and hydraulic shear is imposed on the fluid being mixed so as to enhance the mixing thereof.

Another feature of the invention resides in the provision of a construction in which the loading on the respective ends of the head are rendered automatically self-equalizing during a mixing operation.

Another feature resides in the provision of a control plate which is adjustable with respect to an inlet end of the head to regulate vortexing and air entrainment.

Other features and advantages will become more readily apparent when considered in view of the description and specification in which:

FIG. 1 is a vertical sectional view of a mixing head construction of this invention taken along line 1—1 of FIG. 2.

FIG. 2 is a plan view of the mixing head of FIG. 1 having a portion thereof broken away.

FIG. 3 is a plan view of a slightly modified head construction.

FIG. 4 is a sectional view taken along line 4—4 on FIG. 3.

FIG. 5 is a side elevation view of a modified head construction with portions thereof broken away.

FIG. 5A is a plan view taken along line 5A—5A on FIG. 5.

FIG. 6 is a plan view of a distance piece employed in the head construction of FIG. 5.

FIG. 7 is a plan view of a modified distance piece construction.

FIG. 8 is a side elevation view of the distance piece of either FIG. 6 or FIG. 7.

FIG. 9 is a side elevation of still another modification having parts shown in section.

FIG. 10 is an elevation view of still another form of the invention.

FIG. 11 illustrates the head construction of FIGS. 1 and 2 in operation.

Referring to the drawings, there are shown several different embodiments of the instant invention. FIGS. 1 and 2 illustrate a mixing head 20 that comprises essentially a pair of similarly constructed frusto-conically shaped members 21, 22 and a distance piece 23 interposed therebetween. As shown in FIG. 1, each frusto-conical member or head end 21, 22 is defined by an imperforate frusto-conical section having its small end 21A, 22A respectively defining a fluid inlet and its larger or base end 21B, 22B defining a fluid outlet. Concentrically disposed within each member 21, 22 is a sleeve or hub 24, 25, respectively, by which the respective conical members 21, 22 are fitted to a drive shaft 26. Diametrically opposed vanes 24A, 25A interconnect the respective hubs 24, 25 to the wall portion of the conical members. In the illustrated embodiment the respective vanes 24A, 25A are formed integral with their respective hub 24, 25 and the walls of the conical members. In FIG. 1 the vanes 24A, 25A are disposed in a vertical plane. In a modified head construction 27 of the invention, as shown in FIG. 3, the vanes 27A may be pitched at an angle.

As shown in FIG. 1, the ends 24B, 25B of the hub 24, 25 adjacent the small end of the respective conical members are provided with a conical surface which are adapted to abut against a stop 28 or stop washer 29. The respective conical members 21, 22 are co-axially spaced along the drive shaft 26 so that the large discharge ends 21B, 22B thereof face or discharge toward one another. Interposed between the discharge ends 21B, 22B of the respective conical members 21, 22 is the distance piece 23.

In the illustration of FIG. 1 the distance piece 23 comprises a tubular or cylindrically shaped body which has full open end portions 23A, 23B, which are arranged to abut in contiguous relationship to the discharge end of the respective conical members. To provide a tight fit between the cylinder 23 and the respective conical member 21, 22 complementary shoulders are formed at 28, 29 on the respective elements so that they key or frictionally lock together. It will be observed that the full open ends 23A, 23B of the distance piece 23 defines an unrestricted communication with the discharge ends 21B, 22B of the respective members 21, 22. Thus the distance piece 23 in effect defines a mixing chamber 30 which receives the unrestricted flow of fluid discharging from the respective ends of members 21 and 22. Circumferentially spaced about the walls of the cylinder 23 are a series of discharge ports 31. In the illustrated embodiment, the respective ports 31 constitute a series of elongated machined openings extending substantially the height of the piece 23.

Means for securing the respective end members 21, 22 and distance piece 23 to the shaft 26 includes a bolt 32 which is threaded into a tapped bore 33 in the end of the shaft 26. A washer 29A having a spherical or conical surface is interposed between the bolt 32 and the hub 25 of the lower conical member 22.

In operation the head 20, as described, is secured to the end of a drive shaft 26. The shaft 26 in turn is suitably secured to the drive spindle of an electric motor or the like 34. (See FIG. 11.) The head 20 is then submerged in the fluid to be mixed, and the motor energized to impart a rotating or centrifugal action to the head 20. Due to the rotary motion imparted to the specific head construction 20, a fluid flow is created in which fluid is drawn into each of the respective inlets 21A, 22A of the upper and lower conical members 21, 22 and discharged therefrom into the mixing chamber 30 defined by the distance piece 23. Thus the unrestricted flow of the fluid entering the respective inlets are discharged into the mixing chamber 30 and are therein intensely mixed. The intimately mixed fluid within the mixing chamber 30, due to the centrifugal force imparted thereto is discharged laterally therefrom through the discharge ports 31. In flowing through the ports 31 of the rapidly rotating head 20, the fluid is subjected to a mechanical shearing effect which enhances further breaking up of the fluid or particles being mixed. Further, the force with which the fluid is discharged through the ports 31 and directed against the fluid surrounding the head 20 effects a further hydraulic shearing action on the mixing fluid. Because of the rapid and unrestricted flow of fluid through the mixing head 20 in accordance to the current flow illustrated in FIG. 11, and because of the mechanical and hydraulic shearing effect imparted thereto upon the discharge of the fluid from the mixing chamber 30, an intense mixing action results.

A feature of the head construction 20 described resides in the unrestricted flow of fluid from the end members 21 and 22 directly into the mixing chamber 30. Because of the construction described choking up of the head 20 is minimized when working with viscous fluids. This is because there is no restriction interposed within and between the ends of the head 20. Thus the tendency of the fluid mixing therein to assume the nature of a solid is greatly minimized. As a result, back pressure or load on the motor 34 is minimized. Also the mixing action is not affected as would be the case if the head were permitted to choke up, because of a restriction or partition disposed within the chamber.

To control vortexing or to regulate the entrainment of air, means are provided on the drive shaft to dampen the inlet 21A of member 21. The vortexing control means comprises a disk or plate 36 which is slidably mounted on the shaft 26 for movement toward and away from the inlet end 21A of the upper conical member 21. Thus by adjustment of the plate 36 the inlet opening 21A can be regulated. By moving the plate 36 closer to the inlet 21A, the amount of air or vortexing can be reduced accordingly. Means for adjustably positioning the control plate 36 on the shaft 26 may comprise a set screw 36A which extends through the collar 36B of the disk 36 to bear against the shaft 26 in the set position thereof.

FIGS. 5 to 8 illustrate a modified embodiment of the invention. In this form the mixing head 40 comprises a pair of frusto-conical members 41, 42 which are constructed in the same manner as hereinbefore described with reference to either FIGS. 1, 2 or FIGS. 3, 4. The respective frusto-conical members 41 and 42 are spaced along a drive shaft 26 in a similar manner as before described. However, in this form of the invention the distance piece 43 comprises a plate shaped member, preferably one shaped in the nature of a disk. As shown, the disk 43 is mounted to the shaft 26 and is maintained in position between the enlarged discharge ends 41B, 42B of the respective frusto-conical members 41 and 42. It will be noted that the disk 43 is spaced from the respective discharge ends 41B, 42B of members 41 and 42. Means for maintaining the disk 43 spaced may include, for example, spacer sleeves 44, 45 which, as shown in FIG. 8, are connected integral to the disk 43. The arrangement is such that the ends of the respective spacer sleeves 44, 45 abut against the adjacent ends of the hub 46, 47 of the associated frusto-conical members 41 and 42. Accordingly the upper end of the hub 46 of member 41 abuts against a stop 48, and the respective members 41, 42 and 43 are fixed to the shaft 26 by a washer 49 and bolt 50, the latter of which is threaded into the end of the drive shaft.

As seen in FIG. 5, the disk or blade 43 extends laterally beyond the circumference or periphery of either of members 41 and 42. In the arrangement described it will be apparent that when the shaft 26 is rotated, the respective end members 41, 42 and disk 43 therebetween will rotate. Because the disk 43 extends laterally beyond the periphery of the respective members 41, 42 it will be apparent that the peripheral speed of the disk will be greater than that of the respective conical members 41, 42.

In accordance with this invention the outer peripheral edge of the blade or disk 43 is slotted or formed with a plurality of circumferentially extending teeth. In the form illustrated in FIG. 6, the teeth 43A are defined by circumferentially spaced slotted portions 43B inclined in the direction of rotation as indicated by arrow 51. Thus the trailing edge 43C of the respective slots 43B function in the nature of a cutting edge to effect a mechanical shearing action on the fluid being mixed when rotating. To increase the wear qualities of the cutting edge a carbide cutting edge 52 may be added to the trailing edge of the slot 43B.

In a modified disk 55, as shown in FIG. 7, the teeth 55A may be serrated in the nature of a rotary saw blade. If desired the disk may be provided with a series of openings 53 extending therethrough as shown in the form of FIG. 6.

The head 40 described operates as follows: Upon effecting rotation of the head 40 in a tank of fluid to be mixed, the upper and lower ends 41, 42 effect a pumping action in which a current flow is established in a manner hereinbefore described, i.e. the fluid is drawn into the respective small inlet ends 41A, 42A of end members 41 and 42 and discharged out through the enlarged open ends 41B and 42B respectively. In doing so the respective discharging streams are directed onto the disk 43. The rotation of the disk 43 in turn tends to discharge the fluid laterally outward with the outer edges or cutting teeth shearing through the fluid. The arrangement is such that the full open ends in the respective discharge ends of the respective head ends 41 and 42, and the peripheral action of the disk 43 greatly minimizes any tendency of choking up of the head. As a result effective mixing is attained without loss of power. Consequently any tendency of the fluid to collect to form a mass in the nature of a solid is eliminated. As a result the buildup of a back pressure on the motor is obviated. Thus head 40 has particular utility in working viscous fluids or fluid having mixed therein solid particles required to be pulverized. The rapidly rotating disk 43 with its cutting edges effect an efficient pulverizing action on such particles while effecting at the same time an efficient mixing of the fluids in solution. The head of FIG. 5 is especially useful in mixing paints having chrome pigments or the like. If desired a control plate 36 may also be utilized therewith, as herein described.

FIG. 9 illustrates still another embodiment 60 of the invention. In this form of the invention the respective end members 61, 62 are also constructed in a manner as hereinbefore described. However in this form of the invention the respective members 61, 62 are slidably mounted on drive shaft 63 for movement toward and away from one another. Fixed to the shaft between the discharge ends of members 61 and 62 is a disk 64 of the type described with reference to FIG 5. However, in this form of the invention resilient spacers 65 are interposed between the fixed disk 64 and each of the respective movable end members 61 and 62. In the illustrated embodiment the resilient means 65 comprises a compression coil spring disposed on either side of the blade, or disk 64. Accordingly the spring 65 bears against one side of the disk 64 and the hub 66, 67 of each respective end member 61 and 62. The respective components of head 60 are secured to the shaft between stop 68 and a bolt 69 threaded into the end of the shaft 63.

In operation the construction of head 60 is identical with the operation of head 40 herein described except that any unequal loadings imparted onto the respective end members 61, 62 can be automatically compensated by relative movement of the respective end members 61, 62. Thus it will be noted that the respective end members 61, 62 can, during a mixing operation, be moved toward or away from one another a limited amount due to the spring spacer 65 so as to equalize the loadings thereon.

FIG. 10 illustrates a further modification. In this form the head 70 is similar to the head construction 40 of FIG. 5, except that the respective discharge ends 71A, 72A of end members 71 and 72 are formed of relative cross-sectional areas. As shown, the discharge opening 71A of the upper end member 72 has a greater cross-sectional area than the discharge opening 72A of the lower member 72. In operation, the head 70 of FIG. 10 is similar to that of head 40 except that the relative difference in the cross-sectional areas of the respective discharge end portions create a difference in the rate of fluid flow out from the respective discharge ends 71A, 72A of members 71, 72 during a mixing operation. In this manner the meeting of different particles of the circulating fluids is assured in the discharge area between the two conical end members 71, 72 where the material issues at different speeds. The function of the disk 73 is similar to that of disk 43.

From the foregoing it will be realized that each of the described modified head constructions can be used with equal facility for mixing in a liquid a material that is either lighter and/or heavier than the liquid, or for mixing liquids of relative viscosities in a minimum of time and with a minimum of power. Each of the respective constructions will minimize choking up of the head. Each of the head constructions will create an intense mixing action with a minimum of excessive circulation. Each may be provided with means for controlling vortexing and/or the regulation of air entrainment. Each head construction is further capable of imparting a mechanical and hydraulic shear on the material being mixed. Each is provided with vanes which are integrally formed in the end members and thereby eliminate any spacing between the ends of the vanes and the wall of the end members which would otherwise create torque, whip and vibration. Each is relatively simple in construction and operation.

While the instant invention has been disclosed with reference to particular embodiments thereof, it is to be appreciated that the invention is not to be taken as limited to all of the details thereof as modifications and variations thereof may be made without departing from the spirit or scope of the invention.

What is claimed is:

1. A mixing head comprising a pair of hollow frusto-conical members, each of said members having vane means connected internally thereof, and each of said members and connected vanes adapted to be co-axially disposed in spaced relationship relative to each other on a drive shaft, each of said members having full open end portions wherein the smaller end of the respective members defines a fluid inlet to said member and the respective larger ends thereof define a full open end axial the outlet for the fluid entering said respective inlets, and means interposed between said members for maintaining said large end portion of said conical member and their connected vane means in spaced co-axial relationship along said shaft whereby said means effects a shearing and intimate mixing of the respective fluids entering through the inlet ends of the respective members.

2. A mixing head comprising
   (a) a pair of spaced apart frusto-conical members adapted to be co-axially disposed on a drive shaft, vane means connected internally of each of said frusto-conical members, said vane means of the respective members being spaced apart in the co-axially disposed position of said members on said shaft,
   (b) each of said members having opposed full open end portions wherein its smaller end defines a fluid inlet and its larger end a full unobstructive axially disposed fluid outlet for the fluid entering the inlet end whereby the larger ends of the respective members discharge directly toward one another,
   (c) means interposed between said members and the respective vane means thereof for ejecting the fluid discharging from the respective axially disposed outlets of said members in a laterally outward direction therefrom and for mechanically effecting a shearing action on the fluid so ejected.

3. The invention as defined in claim 2 wherein said latter means extends at least to the periphery of the discharge opening of the respective members.

4. The invention as defined in claim 2 wherein
   (a) said latter means comprises a cylindrical distance piece disposed between said enlarged discharge ends of the respective frusto-conical members to define a mixing chamber for the fluid discharging from said conical member when in operation,
   (b) said mixing chamber having its ends in full open communication with the respective discharge ends of said members,
   (c) and said distance piece having openings spaced about the periphery thereof to define discharge ports from said mixing chamber.

5. A centrifugal mixing head comprising
   (a) a shaft adapted to be connected to a suitable motive means for rotation,
   (b) a pair of frusto-conical members secured in spaced co-axial relationship along said shaft to rotate therewith, each of said frusto conical members having internal vanes,
   (c) said conical members having their respective larger ends discharging toward each other and having their remote smaller outer ends defining the respective inlets thereto,
   (d) a distance piece defining a tubular mixing chamber secured between the larger ends of said conical members to rotate with said members, the ends of said distance piece being in full open communication with the respective larger ends of said members,
   (e) and said distance piece having a series of circumferentially spaced openings formed in the wall portion thereof to define discharge ports from said mixing chamber defined thereby.

6. A centrifugal mixing head comprising
   (a) a shaft adapted to be driven by a suitable power driven means,
   (b) a pair of frusto-conical members secured in co-axially spaced relationship along said shaft,
   (c) said conical members having their respective larger ends discharging toward each other and having their remote smaller outer ends defining inlets thereto.
   (d) each of said conical members including a hub for slidably receiving said shaft,
   (e) diametrically opposed vane means interconnected between said hub and the wall portion of the respectively conical members,
   (f) a cylindrical shaped distance piece for defining a mixing chamber having opposed ends disposed in full open communication with the respective discharge ends of said members, for receiving the fluid discharging from the ends of said conical members,
   (g) means defining a frictional fit between said distance piece and each of said conical members, and
   (h) said distance piece having a series of longitudinally extending slotted openings circumferentially spaced about the periphery thereof.

7. A mixing head comprising
   (a) opposed spaced apart pumping means adapted to be submerged in a fluid, said pumping means including a frusto-conical member having internal vanes,
   (b) means for imparting a rotary motion to said spaced pumping means to create a pumping action in which opposed streams of pumped fluid are directed toward one another,
   (c) tubular means in spaced relationship to the respective vanes thereof interposed between said opposed means to result in both a mechanical and hydrostatic shear on the fluids being directed thereto upon the rotation of said latter means in unison with said spaced apart pumping means.

8. A centrifugal mixing head comprising
   (a) a shaft adapted to be driven by a suitable power driven means,
   (b) a pair of frusto-conical members secured in co-axially spaced relationship along said shaft, said members each being formed with imperforate walls,
   (c) said conical members having their respective larger ends discharging toward each other and having their remote smaller ends defining the respective inlets thereto,
   (d) each of said conical members including a hub for slidably receiving said shaft,
   (e) diametrically opposed vane means connected between said hub and the imperforate wall of each of said conical members, the respective edges of said vane means being integrally fused to said hub and wall of said members,
   (f) a cylindrically shaped distance piece defining a mixing chamber secured between the respective discharging ends of said conical members,
   (g) said distance piece having its respective open ends in full communication with the respective discharge ends of said conical members,
   (h) complementary shoulder means formed on the ends of said distance piece and each of said conical members to effect interlocking engagement therebetween,
   (i) said distance piece having a series of longitudinally extending slotted openings circumferentially spaced about the periphery thereof,
   (j) and means for securing said mixing head on said shaft.

9. A mixing head comprising
   (a) opposed spaced apart pumping means adapted to be submerged in a fluid, said pumping means including a frusto-conical member having internal vanes,
   (b) means for imparting a rotary motion to said spaced pumping means to create a pumping action in which opposed streams of pumped fluid are directed toward one another,
   (c) means interposed between said opposed means in spaced relationship to the respective vanes thereof to result in both a mechanical and hydrostatic shear on the fluids being directed thereto,
   (d) and means slidably mounted on said shaft so as to be adjustably disposed with respect to one of said opposed means to control vortexing.

10. A centrifugal mixing head comprising a pair of frusto-conical members arranged in spaced aligned relationship with their respective larger ends discharging towards each other and having their remote smaller outer ends defining the respective inlets thereto, each of said conical members having internal vanes, and a cylindrical member defining a mixing chamber secured between the larger ends of said conical members with the ends of said conical members and of said cylindrical member being in full open communication with each other, said cylindrical member being formed with a plurality of circumferentially spaced longitudinally openings extending therethrough to define discharge ports whereby said cylindrical member effects a shearing and intimate mixing of the materials entering through the inlet ends of the respective conical members.

References Cited by the Examiner

UNITED STATES PATENTS

| | | | |
|---|---|---|---|
| 1,242,445 | 10/17 | Ittner. | |
| 1,762,950 | 6/30 | Beers | 241—46 |
| 1,768,955 | 7/30 | Johnson | 259—96 X |
| 2,254,127 | 8/41 | Underwood | 259—96 |
| 2,635,860 | 4/53 | McLeod | 259—96 |

J. SPENCER OVERHOLSER, *Primary Examiner.*